United States Patent [19]

Hong

[11] Patent Number: 5,006,328

[45] Date of Patent: Apr. 9, 1991

[54] METHOD FOR PREPARING MATERIALS FOR HYDROGEN STORAGE AND FOR HYDRIDE ELECTRODE APPLICATIONS

[76] Inventor: Kuochih Hong, 4853 Gambler, Troy, Mich. 48098

[21] Appl. No.: 412,098

[22] Filed: Sep. 25, 1989

Related U.S. Application Data

[60] Continuation-in-part of Ser. No. 253,112, Oct. 4, 1988, abandoned, which is a division of Ser. No. 122,042, Nov. 17, 1987, Pat. No. 4,849,205.

[51] Int. Cl.$^5$ .......................... C01B 6/00; H01N 4/00
[52] U.S. Cl. ..................................... 423/644; 420/580; 420/590; 420/900; 429/101; 429/203; 429/218
[58] Field of Search ....................... 420/900, 590, 580; 423/644; 429/101, 203, 218, 40–42

[56] References Cited

U.S. PATENT DOCUMENTS

| | | | |
|---|---|---|---|
| 3,824,131 | 7/1974 | Beccu | 136/20 |
| 4,112,199 | 9/1978 | Dunlop et al. | 429/29 |
| 4,160,014 | 7/1979 | Gamo et al. | 423/644 |
| 4,370,163 | 1/1983 | Moriwaki et al. | 420/582 |
| 4,457,891 | 7/1984 | Bernauer et al. | 420/434 |

FOREIGN PATENT DOCUMENTS 0197675 10/1986 European Pat. Off.
0197680 10/1986 European Pat. Off.
55-91950 7/1980 Japan.

OTHER PUBLICATIONS

Van Mal et al., Jour. Less-Common Metals, 35 (1974) 65.

Primary Examiner—Upendra Roy

[57] ABSTRACT

A method for providing a multicomponent alloy for hydrogen storage and for a hydride electrode. The steps involved in the method include: providing a quantity of elements A, B, C, ..., where said elements are selected from the group consisting of Mg, Ti, V, Cr, Mn, Fe, Co, Ni, Al, Y, Zr, Nb, Pd, Mo, Ca, Si, C, Cu, Ta, and rare earth elements, the quantity of the elements including nickel and at least two other elements from said group; apportioning the quantity of the elements in order to form a composition $A_aB_bC_c$... such that the composition $A_aB_bC_c$... contains 5 to 65 mole percent of nickel and further such that the composition $A_aB_bC_c$... has, when in the form of a multicomponent alloy, a heat of hydride formation that is in a range of between $-3.5$ and $-9.0$ kcal/mold H; and, finally, melting the composition $A_aB_bC_c$... in order to form the desired multicomponent alloy.

8 Claims, No Drawings

METHOD FOR PREPARING MATERIALS FOR HYDROGEN STORAGE AND FOR HYDRIDE ELECTRODE APPLICATIONS

CROSS-REFERENCE TO RELATED APPLICATIONS

This Application is a Continuation-in-Part of my co-pending application, Ser. No. 07/253,112, filed Oct. 4, 1988, now abandoned, which was a Divisional application of Ser. No. 07/122,042, filed Nov. 17, 1987, now U.S. Pat. No. 4,849,205, issued Jul. 18, 1989.

BACKGROUND OF THE INVENTION

1. Field of the Invention

This invention relates to hydrogen storage materials and their electrochemical application. More particularly, this invention relates to the composition of novel materials for rechargeable hydride electrode materials. This invention further relates to a simple but effective method to determine a multi-component alloy as a potential candidate for hydride electrode applications.

2. Description of the Prior Art

Hydrogen can be stored in a heavy cylinder at high pressure as a gas at room temperature, or it can be stored in a well insulated container at low pressure as a liquid at ultra low temperature. The high pressure storage method involves significant safety problems, and relatively little hydrogen can be stored in a given volume of container vessel. The ultra low temperature storage method involves a significant waste of electricity to power cryogenic liquefaction devices, and, because of evaporation, the hydrogen cannot be stored indefinitely.

A preferable way to store hydrogen is to use a solid material which can absorb hydrogen in a reversible manner. This process is known as hydriding. Two examples of hydriding processes are:

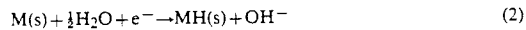

where M(s) is the solid hydrogen storage material, MH(s) is the solid hydride, $e^-$ is an electron and $OH^-$ is the hydroxyl ion. Equation (1) is a solid-gas reaction process which can be used to store thermal energy. Equation (2), on the other hand, is is an electrochemical reaction that can be used to store electrical energy. In both equations, hydrogen is stored during a charge reaction and is released during a discharge reaction.

Not every metal alloy can be used in the above hydriding process. It is also the case that not every metal alloy that can be utilized in the solid-gas reaction (Eq. 1) can be used in the electrochemical reaction (Eq. 2). For example, the hydrogen storage materials: Ti-Zr-Mn-Cr-V alloys, disclosed in U.S. Pat. No. 4,160,014 are not readily suitable for electrochemical reactions, as for example those involved in a battery application. Another example of hydrogen storage materials is given in Japanese Patent Sho No. 55-91950 which discloses alloys with the following composition formula: $(V_{1-x}Ti_x)_3Ni_{1-y}M_y$, where M equals Cr, Mn, Fe, and where x and y are defined by: $0.05 \leq x \leq 0.8$ and $0 \leq y \leq 0.2$. These materials restrict the amount of Ni+M equal to 25 atomic percent with less than 5 atomic percent of M, and the amount of Ti+V equal to 75 atomic percent. As a result, in addition to the potential corrosion problem adduced from using these materials, the hydrides of these materials are either very stable at ambient temperature or are of high cost. Consequently, these materials are not readily usable for electrochemical applications.

Among the many hydride materials that have been developed, only a few of them have been tested electrochemically. Examples of such research are U.S. Pat. Nos. 3,824,131, 4,112,199, and 4,551,400. The hydride electrode materials invented primarily by the present inventor and disclosed in U.S. Pat. No. 4,551,400 have superior properties as compared to the hydride electrode materials described in the other patents hereinabove cited. The materials disclosed in the U.S. Pat. No. 4,551,400 are grouped as:

(a) $TiV_{1-x}Ni_x$, where $0.2 \leq x \leq 1.0$;
(b) $Ti_{2-x}Zr_xV_{4-y}Ni_y$, where $0 \leq x \leq 1.50$, $0.6 \leq y \leq 3.50$, which can be rewritten as $Ti_{1-x'}Zr_{x'}V_{2-y'}Ni_{y'}$, where $0 \leq x' \leq 0.75$, $0.3 \leq y' \leq 1.75$; and
(c) $Ti_{1-x}Cr_xV_{2-y}Ni_y$, where $0.2 \leq x \leq 0.75$, $0.2 \leq y \leq 1.0$.

These materials are all limited to the pseudo $TiV_2$ type alloys with the following composition restriction:
Group (a): Ti=33.3 atomic %, V+Ni=66.7 atomic %;
Group (b): Ti+Zr=33.3 atomic %, V+Ni=66.7 atomic %; and
Group (c): Ti+Cr=33.3 atomic %, V+Ni=66.7 atomic %.

This restriction results in all these materials having one or several weaknesses, especially high cost, short life cycle, and low capacity, as well as in some cases poor rate capability.

A good hydrogen storage material of the class described suitable for electrochemical applications has not been reported to date in the scientific literature, as well as Letters Patent. Particularly there has been no disclosure of how to provide a simple qualitative approach for developing or optimizing hydride materials for storing hydrogen as well as for hydride electrodes. As a result, the common method has been one of trial-and-error, which has resulted in the expenditure of considerable wasted time, money and human resources.

Consequently, what is needed is a good hydrogen storage electrode material, having at the minimum the following properties:
Excellent hydrogen storage capacity;
superior electrochemical catalyst for hydrogen oxidation;
high hydrogen diffusion rate;
suitable hydrogen equilibrium pressure; and
reasonable cost.

To fit the above restrictions, the present invention provides, through the application of thermodynamics, kinetics and electrochemistry, a method for selecting a good hydride candidate suitable for electrochemical applications. More particularly, the composition of advanced hydride electrode materials and the methods of their fabrication are disclosed herein.

SUMMARY OF THE INVENTION

The present invention discloses the following materials, represented by formulae, for hydrogen storage and hydride electrode applications.

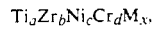

where M equals any of Al, Si, V, Mn, Fe, Co, Cu, Nb, Ag, Pd, and rare earth metals, and where a, b, c, d, and x are defined by: $0.1 \leq a \leq 1.4$, $0.1 \leq b \leq 1.3$, $0.25 \leq c \leq 1.95$, $0.1 \leq d \leq 1.4$, $a+b+c+d=3$, and $0 \leq x \leq 0.2$.

$$Ti_aCr_bZr_cNi_dV_{3-a-b-c-d}M_x,$$

where M equals any of Al, Si, Mn, Co, Cu, Fe, Nb, Ag, Pd, and rare earth metals, and where a, b, c, d, and x are defined by: $0.1 \leq a \leq 1.3$, $0.1 \leq b \leq 1.2$, $0.1 \leq c \leq 1.3$, $0.2 \leq d \leq 1.95$, $0.4 \leq a+b+c+d \leq 2.9$, $0 \leq x \leq 0.2$, and for $x=0$ and $b=0.5$, then $a+c \neq 0.5$.

$$Ti_aZr_bNi_cV_{3-a-b-c}M_x,$$

where M equals any of Al, Si, Cr, Mn, Fe, Co, Cu, Nb, Ag, Pd, and rare earth metals, and where a, b, c, and x are defined as: $0.1 \leq a \leq 1.3$, $0.1 \leq b \leq 1.3$, $0.25 \leq c \leq 1.95$, $0 \leq x \leq 0.2$, and $0.6 \leq a+b+c \leq 2.9$; for $x=0$ then $a+b \neq 1$ and $0.24 \leq b \leq 1.3$.

$$Ti_aMn_bV_cNi_dM_x,$$

where M equals any of Al, Si, Cr, Fe, Co, Cu, Nb, Zr, Ag, Pd, and rare earth metals, and were a, b, c, d, and x are defined by: $0.1 \leq a \leq 1.6$, $0.1 \leq b \leq 1.6$, $0.1 \leq c \leq 1.7$, $0.2 \leq d \leq 2.0$, $a+b+c+d=3$, and $0 \leq x \leq 0.2$.

The materials disclosed by the present invention may be prepared by electric arc, induction or plasma melting under inert atmosphere. The present invention also provides methods of storing hydrogen by the materials disclosed.

The present invention further discloses a general method to develop a potential multicomponent alloy $A_aB_bC_c$... for hydrogen storage and rechargeable hydride electrode applications. This method includes the following two steps:

Step 1. Let the candidate alloy $A_aB_bC_c$... contain at least 5 mole percent, but less than 65 mole percent, of nickel metal in the composition, preferably, 15 to 45 mole percent of nickel; and Step 2. Set the proper numbers of a, b, c, ... in the alloy $A_aB_bC_c$... such that it has a calculated heat of hydride formation, $H_h$, between $-3.5$ and $-9.0$ Kcal/mole H, preferably $-4.5$ to $-8.5$ Kcal/mole H. The equation for the $H_h$ calculation is:

$$H_h=(aH_h(A)+bH_h(B)+cH_h(C)+\ldots)/(a+b+c+\ldots)+K, \quad (3)$$

where $H_h(A)$, $H_h(B)$, $H_h(C)$, ... are the heat of hydride formation of the metals A, B, C, ..., respectively, in Kcal/mole H, and where K is a constant related to the heat of formation of the alloy $A_aB_bC_c$... and the heat of mixing of hydrides of A, B, C, .... The values of K are: 0.5, $-0.2$, and $-1.5$ for $a+b+c+\ldots$ equal to 2, 3, 6, respectively. However, for practical purposes, the value of K can be set to zero. The values of the heat of hydride formation of metal elements can be found elsewhere, exemplified by the following:

Mg: $-9.0$, Ti: $-15.0$, V: $-7.0$, Cr: $-1.81$, Mn: $-2.0$, Fe: 4.0, Co: 4.0, Ni: 2.0, Al: $-1.8$, Y: $-27.0$, Zr: $-19.5$, Nb: $-9.0$, Pd: $-4.0$, Mo: $-1.0$, Ca: $-21.0$, Si: $-1.0$, C: $-1.0$, Cu: 2.0, Ta: $-10.0$, and rare earth metals: $-25.0$, all in units of Kcal/mole H.

For the alloy with $a+b+c+\ldots$ other than 2, 3, and 6, K can simply be set equal to zero, or the formula may be normalized to the nearest pseudo type and therefore its heat of hydride formation can still be obtained by equation (3).

DETAILED DESCRIPTION OF THE PREFERRED EMBODIMENTS

The present invention discloses four main groups of materials which can serve as a hydride for reversible hydrogen storage applications, and more particularly, can serve as a negative electrode active material for electrochemical applications.

The first group of materials contains titanium, zirconium, nickel and chromium. It may also include another element or elements such as aluminum, vanadium, manganese, iron, cobalt, copper, niobium, silicon, silver and palladium, or rare earth metals. The composition of an alloy in this group can be represented by the following formula:

$$Ti_aZr_bNi_cCr_dM_x,$$

where M equals any of Al, Si, V, Mn, Fe, Co, Cu, Nb, Ag, Pd, and rare earth metals, and where a, b, c, d, and x are defined by: $0.1 \leq a \leq 1.4$, $0.1 \leq b \leq 1.3$, $0.25 \leq c \leq 1.95$, $0.1 \leq d \leq 1.4$, $a+b+c+d=3$, and $0 \leq x \leq 0.2$. Preferably, $0.25 \leq a \leq 1.0$, $0.2 \leq b \leq 1.0$, $0.8 \leq c \leq 1.6$, and $0.3 \leq d \leq 1.0$.

The second group of materials of the present invention contains titanium, chromium, zirconium, nickel and vanadium. Another element or elements can be added, such as aluminum, silicon, manganese, iron, cobalt, copper, niobium, silver, palladium, or rare earth metals. The composition of an alloy in this group is expressed by the following formula:

$$Ti_aCr_bZr_cNi_dV_{3-a-b-c-d}M_x,$$

where M equals any of Al, Si, Mn, Co, Cu, Fe, Nb, Ag, Pd, and rare earth metals, and where a, b, c, d, and x are defined by: $0.1 \leq a \leq 1.3$, $0.1 \leq b \leq 1.2$, $0.1 \leq c \leq 1.3$, $0.2 \leq d \leq 1.95$, $0.4 \leq a+b+c+d \leq 2.9$, $0 \leq x \leq 0.2$, and for $x=0$ and $b=0.5$, then $a+c \neq 0.5$. Preferably, $0.15 \leq a \leq 1.0$, $0.15 \leq b \leq 1.0$, $0.2 \leq c \leq 1.0$, $0.4 \leq d \leq 1.7$, and $1.5 \leq a+b+c+d \leq 2.3$.

The third group of materials described by the present invention contains titanium, zirconium, nickel and vanadium. Another element or elements can be added, such as aluminum, silicon, manganese, iron, cobalt, copper, niobium, silver, palladium, or rare earth metals. The composition of an alloy in this group is expressed by the following formula:

$$Ti_aZr_bNi_cV_{3-a-b-c}M_x,$$

where M equals any of Al, Si, Cr, Mn, Fe, Co, Cu, Nb, Ag, Pd, and rare earth metals, and where a, b, c, and x are defined as: $0.1 \leq a \leq 1.3$, $0.1 \leq b \leq 1.3$, $0.25 \leq c \leq 1.95$, $0 \leq x 0.2$, and $0.6 \leq a+b+c \leq 2.9$; for $x=0$ then $a+b \neq 1$ and $0.24 \leq b \leq 1.3$. Preferably, $0.15 \leq a \leq 0.8$, $0.2 \leq b \leq 0.8$, $0.5 \leq c \leq 1.5$, and $1.5 \leq a+b+c \leq 2.5$.

The fourth group of materials according to the present invention contains titanium, manganese, nickel, and vanadium. Another element or elements can be added, such as aluminum, silicon, iron, cobalt, copper, zirconium, niobium, silver, palladium, or rare earth metals. The composition of an alloy in this group is expressed by the following formula:

$$Ti_aMn_bV_cNi_dM_x,$$

where M equals any of Al, Si, Cr, Fe, Co, Cu, Nb, Zr, Ag, Pd, and rare earth metals, and were a, b, c, d, and x are defined by: $0.1 \leq a \leq 1.6$, $0.1 \leq b \leq 1.6$, $0.1 \leq c \leq 1.7$, $0.2 \leq d \leq 2.0$, $a+b+c+d=3$, and $0 \leq x \leq 0.2$. Preferably, $0.5 \leq a \leq 1.3$, $0.3 \leq b \leq 1.0$, $0.6 \leq c \leq 1.5$, and $1.4 \leq a+b+c \leq 2.7$.

The present invention importantly also provides a simple method to provide a multicomponent alloy for hydrogen storage and rechargeable hydride electrode applications. According to this method, amounts of selected elements are provided, which are then mutually apportioned according to the methodology hereinbelow elaborated, and then the apportioned elements are alloyed to form the multicomponent alloy for hydrogen storage and hydride electrode. The method to provide a multicomponent alloy $A_aB_bC_c\ldots$ for hydrogen storage applications and for rechargeable hydride electrode applications may be summarized as follows:

A quantity of elements A, B, C, ... are provided, where the elements are selected from the group consisting of Mg, Ti, V, Cr, Mn, Fe, Co, Ni, Al, Y, Zr, Nb, Pd, Mo, Ca, Si, C, Cu, Ta, and rare earth elements, the quantity of these elements includes nickel and at least two other elements from the aforesaid group. The quantity of each of the selected elements is apportioned in order to form a composition $A_aB_bC_c\ldots$ such that the composition $A_aB_bC_c\ldots$ contains 5 to 65 mole percent of nickel and further such that the composition AaBbCc ... has, when in the form of a multicomponent alloy, a heat of hydride formation that is in a range of between $-3.5$ and $-9.0$ Kcal/mole H, wherein the heat of hydride formation is defined by:

$$H_h = (aH_h(A) + bH_h(B) + cH_h(C) + \ldots)/(a+b+c\ldots) + K \quad (3)$$

where $H_h(A)$, $H_h(B)$, $H_h(C)$, ... are the heat of hydride formation of the aforesaid selected elements A, B, C, ..., in units of Kcal/mole H, respectively, where said heat of hydride formation in Kcal/mole H for each of the elements of the aforesaid group is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=4.0$, $H_h(Ni)=2.0$, $H_h(Al)=-1.38$, $H_h(Y)=-27.0$, $H_h(Zr)=-19.5$, $H_h(Nd)=-9.0$, $H_h(pd)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, and $H_h(\text{rare earth elements})=-25.0$, where K is a constant having the values of 0.5, $-0.2$, and $-1.5$ Kcal/mole H for $a+b+c+\ldots$ equal to 2, 3, 6, respectively, and having the value zero Kcal/mole H for $a+b+c+\ldots$ not equal to 2, 3, 6. Lastly, the aforesaid composition $A_aB_bC_c\ldots$ is melted in order to form the desired multicomponent alloy. For an alloy having $a+b+c+\ldots$ other than 2, 3, and 6, K can simply be set equal to zero, or the formula may be normalized to the nearest pseudo type and therefore its heat of hydride formation can still be obtained by equation (3).

The reaction mechanisms on a hydride electrode are very different from that of an electrocatalytic electrode, such as those used for water electrolysis or fuel cells. A hydride electrode not only serves as an electrocatalyst for hydrogen oxidation (during discharge) and water electrolysis (during charge), but also serves as a medium for the storage and release of hydrogen. Because of these dual functions, some researchers have suggested the use of a surface coating to improve the surface catalytic property of a hydride electrode to boost the rate capability. However, this approach can only give a very limited improvement. The surface coating has a very limited domain, and can be easily destroyed by swelling and shrinking processes during the course of the charge and discharge cycles due to the accompanying hydriding and dehydriding of the material during these cycles, respectively. The best way to guarantee a good rate capability of an electrode is to enhance the intrinsic property of a hydrogen storage alloy such that every part of the material body has good catalytic function in addition to hydrogen storage function.

According to the present invention, the alloy $A_aB_bC_c\ldots$ of A, B, C, ... elements should contain at least 5 mole percent of nickel to have a reasonable rate capability, but not contain more than 65 mole percent of nickel, to insure a reasonable amount of hydrogen storage capacity. Preferably, the nickel content is in the range of between 15 to 45 mole percent.

In addition to the restriction of nickel content, according to the present invention, the alloy should meet the hydrogen pressure and bulk diffusion rate requirements set forth hereinabove. The material $A_aB_bC_c\ldots$ should have a calculated heat of hydride formation (i.e., partial molar heat of enthalpy of hydrogen), $H_h$ in the range of between $-3.5$ and $-9.0$ Kcal/mole H. Preferably this heat, $H_h$, is between $-4.5$ and $-8.5$ Kcal/mole H. The heat of hydride formation, $H_h$, of an alloy $A_aB_bC_c\ldots$ can be calculated through the following thermodynamic cycle:

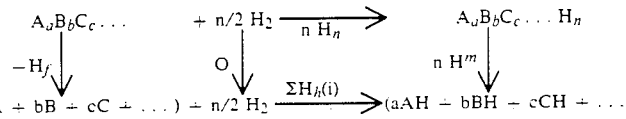

where $H_f$ is the heat of formation of the alloy $A_aB_bC_c\ldots$, $H^m$ is the heat of mixing of hydrides AH, BH, CH, ..., and each is with the respective heat of hydride formation $H_h(i)$, ie., $H_h(A)$, $H_h(B)$, $H_h(C)$, ... in Kcal/mole H.

For $a+b+c+\ldots = n$, it is clear from the above thermodynamic cycle that the heat of hydride formation of the alloy $A_aB_bC_c\ldots$, $H_h$, is:

$$H_h = (aH_h(A) + bH_h(B) + cH_h(C) + \ldots)/(a+b+c+\ldots) + H^m.$$

The mixing of hydrides can be considered the mixing of metals with hydrogen as common species. This process is similar to the mixing of binary fluorides, where the fluoride ions are the common species. From knowledge of fluoride systems, the values of the heat of mixing of binary hydrides to form a relatively stable multicomponent hydride, should be between $-2$ and $-5$ Kcal/mole H, depending upon the metals used. Let $H^m$ equal $-2.5$ Kcal/mole H. On the other hand, in general, the heat of formation of a stable metal alloy, $H_f$, is about $-6.0 \pm 3.0$ Kcal/mole alloy.

Comparing the values of $H^m$ and $H_f$, equation 3, above, can be obtained. Therefore, the heat of hydride formation, $H_h$, of the alloy $A_aB_bC_c\ldots$ can be thereby calculated.

Thus, the steps 1 and 2 described above can be used to provide a simple quantitative method of selecting the composition of a multicomponent alloy for hydrogen storage and hydride electrode applications. Neglecting the small contribution due to M in Groups 1-4, the heat of hydride formation can be calculated by the following equations:

The heat of hydride formation of an alloy in the first group of materials having a composition represented by the formula:

$$Ti_aZr_bNi_cCr_dM_x$$

can be calculated by the following equation:

$$H_h = -5.0a - 6.5b + 0.67c - 0.67d \text{ Kcal/mole H.} \quad (4)$$

where $a+b+c+d=3$.

A suitable alloy in this group should have the value of $H_h$ in the range between $-3.5$ and $-9.0$ Kcal/mole H, and preferably between $-4.5$ and $-8.5$ Kcal/mole H.

The heat of hydride formation of an alloy in the second group of the materials having composition represented by the formula:

$$Ti_aCr_bZr_cNi_dV_{3-a-b-c-d}M_x$$

can be calculated by the following equation:

$$H_h = -2.65a + 1.66b - 4.14c + 2.98d - 7.0 \text{ Kcal/mole H.} \quad (5)$$

A suitable alloy in this group should have a value of $H_h$ in the range of between $-3.5$ and $-9.0$ Kcal/mole H, and preferably between $-4.5$ and $-8.5$ Kcal/mole H.

The heat of hydride formation of an alloy in the third group of the materials having a composition represented by the formula:

$$Ti_aZr_bNi_cV_{3-a-b-c}M_x$$

can be calculated by the following equation:

$$H_h = -2.65a - 4.14b + 2.98c - 7.0 \text{ Kcal/mole H.} \quad (6)$$

A suitable alloy in this group should have a value of $H_h$ in the range of between $-3.5$ and $-9.0$ Kcal/mole H, and preferably between $-4.5$ and $-8.5$ Kcal/mole H.

The heat of hydride formation of an alloy in the fourth group of the material having a composition represented by the formula:

$$Ti_aMn_bNi_cV_dM_x$$

can be calculated by the following equation:

$$H_h = (-15.0a - 2.0b - 2.0c - 7.0d)/(a+b+c+d) \text{ Kcal/mole H.} \quad (7)$$

A suitable alloy in this group should have a value of $H_h$ in the range between $-3.5$ and $-9.0$ Kcal/mole H, and preferably between $-4.5$ and $-8.5$ Kcal/mole H.

The multicomponent alloy in accordance with the present invention can be prepared by induction heating, arc or plasma melting, under an inert atmosphere. A higher temperature as well as several remelting runs will be useful to obtain a more homogeneous material. A small amount of alkalai metal or alkaline metal can be used as a deoxidizing agent during the melting process.

To store gaseous phase hydrogen, the active materials of the invention can be charged at 100 to 300 p.s.i. hydrogen after the air in the whole system has been evacuated. Moderate temperature of between 100 to 200 degrees Centigrade will accelerate the hydriding or dehydriding processes. It is preferred to first granulate the material into small particles in order to ensure complete activation of the material with the hydrogen.

For the electrochemical application, an electrode containing the active material of the present invention is first prepared. The electrode is made in the following manner. The active material powder with or without binder, such as pure nickel, aluminum or copper (up to 10 wt. %), is cold pressed onto a nickel grid or a nickel plated mild steel grid with a pressure of between 5 to 20 tons per square inch. The resulting electrode may be subject to a sintering process (at 600 to 1,100 degrees C for 3 to 10 minutes under protective atmosphere) to enhance the strength of the body structure. Finally, the electrode is activated electrochemically at an electric current density of up to 50 to 100 mA/g rate (cathodic charging followed by anodic discharging) for a couple or several cycles in an alkaline solution. The electrode is then ready to combine with a positive electrode such as an Ni-positive electrode for an electrochemical application.

There are several additional factors to consider regarding the selection of elements for inclusion in the multicomponent alloy according to the present invention. The inclusion of 0.5 to 8 mole percent of manganese can increase hydride electrode shelf-life, lower its cost and serve as an oxygen getter besides serving as a hydrogen absorber. The inclusion of 1 to 20 mole percent of chromium can increase hydride electrode lifetime and aid its structural integrity. The inclusion of 0.5 to 10 mole percent aluminum can result in minimized cost of the multicomponent alloy without sacrificing performance; aluminum further can serve as an oxygen getter. Finally, the inclusion of up to 10 mole percent of at least one rare earth element is advantageous because it can serve as an oxygen getter in addition to serving as a hydrogen absorber.

EXAMPLE 1

A first group of materials is represented by the formula:

$$Ti_aZr_bNi_cCr_dM_x,$$

where M equals any of Al, Si, V, Mn, Fe, Co, Cu, Nb, and rare earth metals, and where a, b, c, d, and x are defined by: $0.1 \leq a \leq 1.4$, $0.1 \leq b \leq 1.3$, $0.25 \leq c \leq 1.95$, $0.1 \leq d \leq 1.4$, $a+b+c+d=3$, and $0 \leq x \leq 0.2$.

Alloys having compositions in this first group are given in Table 1. Proper amounts of pure metal elements were weighed, mixed, pressed into pellets, and then melted together by arc or induction heating under argon atmosphere. Small chunk samples ranging from 100 to 300 mg. were tested electrochemically in a 4M KOH solution. A nickel wire or nickel positive electrode was used as the counter electrode. The electrochemical capacity at a 100 mA/g discharge rate of these alloys measured down to $-700$ mV versus an Hg/HgO reference electrode cut-off potential is shown in Table 1. Materials in this group have high capacity, long life cycles and good rate capability. In this first group, materials given in Table 1 also show the calculated heat of hydride formation in the range of between $-4.5$ and $-8.5$ Kcal/mole H in agreement with the rules stated hereinabove.

EXAMPLE 2

A second group of materials is represented by the formula:

$$Ti_aCr_bZr_cNi_dV_{3-a-b-c-d}M_x,$$

where M equals any of Al, Si, Mn, Co, Cu, Fe, Nb, and rare earth metals, and where a, b, c, d, and x are defined by: $0.1 \leq a \leq 1.3$, $0.1 \leq b \leq 1.2$, $0.1 \leq c \leq 1.3$, $0.2 \leq d \leq 1.95$, $0.4 \leq a+b+c+d \leq 2.9$, and $0 \leq x \leq 0.2$.

Alloys having compositions in this second group were prepared and tested in accordance with the procedures described in Example 1. Some of the experimental results are given in Table 1. Materials in this group have high capacity, long life cycles and good rate capability. In this second group, materials listed in Table 1 also have the calculated heat of hydride formation in the range of between $-4.5$ and $-8.5$ Kcal/mole H, in agreement with the rules stated hereinabove.

EXAMPLE 3

A third group of materials is represented by the formula:

$$Ti_aZr_bNi_cV_{3-a-b-c}M_x,$$

where M equals any of Al, Si, Cr, Mn, Fe, Co, Cu, Nb, and rare earth metals, and where a, b, c, and x are defined as: $0.1 \leq a \leq 1.3$, $0.1 \leq b \leq 1.3$, $0.25 \leq c \leq 1.95$, $0 \leq x \leq 0.2$, and $0.6 \leq a+b+c \leq 2.9$; for $x=0$ then $a+b \neq 1$ and $0.24 \leq b \leq 1.3$.

Alloys having compositions in this group were prepared and tested in accordance with the procedure described in Example 1. Some of the experimental results are also given in Table 1. In this third group, materials listed in Table 1 have the calculated heat of hydride formation in the range between $-4.5$ and $-8.5$ Kcal/mole H, in agreement with the rules stated hereinabove.

EXAMPLE 4

A fourth group of materials is represented by the formula:

$$Ti_aMn_bV_cNi_dM_x,$$

where M equals any of Al, Si, Cr, Fe, Co, Cu, Nb, Zr, and rare earth metals, and were a, b, c, d, and x are defined by: $0.1 \leq a \leq 1.6$, $0.1 \leq b \leq 1.6$, $0.1 \leq c \leq 1.7$, $0.2 \leq d \leq 2.0$, $a+b+c+d=3$, and $0 \leq x \leq 0.2$.

Alloys having compositions in this group were prepared and tested in accordance with the procedures given in Example 1. Some of the experimental results are given in Table 1. The cycle life and rate capability of the alloys in this group are excellent. In this fourth group, materials shown in Table 1 have the calculated heat of hydride formation in the range of between $-4.5$ and $-8.5$ Kcal/mole H, in agreement with the rules stated hereinabove.

TABLE 1

| Electrochemical Capacity and Heat of Hydride Formation of Materials | | |
|---|---|---|
| Material Composition | Capacity[1] | $H_h$[2] |
| Group 1: $Ti_aZr_bNi_cCr_dM_x$ | | |
| $Ti_{0.3}Zr_{1.0}Ni_{1.4}Cr_{0.3}$ | 280 | −7.27 |
| $Ti_{0.4}Zr_{0.8}Ni_{1.4}Cr_{0.4}$ | 290 | −6.53 |
| $Ti_{0.5}Zr_{0.8}Ni_{1.2}Cr_{0.5}$ | 300 | −7.23 |
| $Ti_{0.5}Zr_{0.7}Ni_{1.3}Cr_{0.5}$ | 290 | −6.52 |
| $Ti_{0.5}Zr_{0.6}Ni_{1.4}Cr_{0.5}$ | 275 | −5.80 |
| $Ti_{0.5}Zr_{0.8}Ni_{1.1}Cr_{0.5}Mn_{0.1}$ | 265 | −7.37 |
| Group 2: $Ti_aCr_bZr_cNi_dV_{3-a-b-c-d}M_x$ | | |
| $Ti_{0.4}Cr_{0.4}Zr_{0.2}Ni_{0.6}V_{1.4}$ | 295 | −6.43 |
| $Ti_{0.3}Cr_{0.3}Zr_{0.5}Ni_{1.15}V_{0.45}$ | 268 | −7.18 |
| $Ti_{0.3}Cr_{0.3}Zr_{0.4}Ni_{0.6}V_{1.4}$ | 330 | −7.16 |
| $Ti_{0.35}Cr_{0.35}Zr_{0.5}Ni_{1.0}V_{0.8}$ | 285 | −6.43 |
| $Ti_{0.3}Cr_{0.3}Zr_{0.5}Ni_{0.7}V_{1.2}Cu_{0.1}$ | 310 | −7.28 |
| Group 3: $Ti_aZr_bNi_cV_{3-a-b-c}M_x$ | | |
| $Ti_{0.6}Zr_{0.5}Ni_{1.1}V_{0.8}$ | 310 | −7.38 |
| $Ti_{0.7}Zr_{0.6}Ni_{1.3}V_{0.4}$ | 290 | −7.47 |
| $Ti_{0.7}Zr_{0.4}Ni_{1.3}V_{0.6}$ | 280 | −6.63 |
| $Ti_{0.65}Zr_{0.35}Ni_{1.30}V_{0.70}$ | 305 | −6.38 |
| $Ti_{0.3}Zr_{0.8}Ni_{1.3}V_{0.6}$ | 275 | −7.23 |
| $Ti_{0.5}Zr_{0.5}Ni_{1.1}V_{0.7}Cu_{0.2}$ | 250 | −6.38 |
| Group 4: $Ti_aMn_bV_cNi_dM_x$ | | |
| $Ti_{1.0}Mn_{0.5}V_{0.6}Ni_{0.9}$ | 280 | −6.13 |
| $Ti_{1.1}Mn_{0.5}V_{0.5}Ni_{0.9}$ | 300 | −6.40 |
| $Ti_{1.2}Mn_{0.45}V_{0.45}Ni_{0.9}$ | 310 | −6.75 |
| $Ti_{1.3}Mn_{0.39}V_{0.38}Ni_{0.93}$ | 315 | −7.03 |
| $Ti_{1.1}Mn_{0.5}V_{0.5}Ni_{0.9}Co_{0.1}$ | 280 | −6.40 |

1. mAh/g (at 100 mA/g)
2. Kcal/mole H. The heats of hydride formation are calculated from the equations 4–7, hereinabove.

To those skilled in the art to which this invention appertains, the above described preferred method may be subject to change or modification. Such change or modification can be carried out without departing from the scope of the invention, which is intended to be limited only by the scope of the appended claims.

What is claimed is:

1. A method of forming a multicomponent alloy for hydrogen storage and a hydride electrode for electrochemical application, comprising the steps of:

providing a quality of elements A, B, C, . . . , where said elements are selected from the group consisting of Mg, Ti, V, Cr, Mn, Fe, Co, Ni, Al, Y, Zr, nb, Pd, Mo, Ca, Si, C, Cu, Ta, and rare earth elements, said quantity of said elements including nickel and at least two other elements from said group;

apportioning said quantity of said elements in order to from a composition $A_aB_bC_c$ . . . such that said composition $A_aB_bC_c$ . . . contains 24 to 65 mole percent of nickel and further such that said composition AaBbCc . . . has; melting said composition to form said multicomponent alloy, said multicomponent alloy having a heat of hydride formation that is in a range of between $-3.5$ and $-9.0$ Kcal/mole H, wherein said heat of hydride formation is defined by:

$H_h = (aH_h(A) + bH_h(B) + cH_h(C) = \ldots )/(a+b+c \ldots ) + K$ where $H_h(A)$, $H_h(B)$, $H_h(C)$, . . . are the heat of hydride formation of said elements A, B, C, . . . , in units of Kcal/mole H, respectively, where said heat of hydride formation in said units for each of said elements is given as: $H_h(Mg) = -9.0$, $H_h(Ti) = -15.0$, $H_h(V) = -7.0$, $H_h(Cr) = -1.81$, $H_h(Mn) = -2.0$, $H_h(Fe) = 4.0$, $H_h(Co) = 4.0$, $H_h(Ni) = 2.0$, $H_h(Al) = -1.38$, $H_h(Y) = -27.0$, $H_h(Zr) = -19.5$, $H_h(Nb) = -9.0$, $H_h(pb) = -4.0$, $H_h(Mo) = -1.0$, $H_h(Ca) = -21.0$, $H_h(Si) = -1.0$, $H_h(C) = -1.0$, $H_h(Cu) = 2.0$, $H_h(Ta) = -10.0$, and $H_h(\text{rare earth elements}) = -25.0$, where K is a constant having the value of 0.5, −0.2, and −1.5

Kcal/mole H for a+b+c+ ... equal to 2, 3, 6, respectively, and having the value zero Kcal/mole H for a+b+c+ ... not equal to 2, 3, 6 having a discharge capacity between a range of 250 to 315 mAh/g—has been inserted.

2. The method for providing a multicomponent alloy for hydrogen storage and a hydride electrode of claim 1 wherein said step of apportioning is performed so that said composition $A_aB_bC_c$... of said elements A, B, C, ... contains 24 to 50 mole percent of nickel.

3. The method for providing a multicomponent alloy for hydrogen storage and a hydride electrode of claim 1, wherein said step of apportioning is carried out further so that said composition $A_aB_bC_c$... of said elements A, B, C, ... contains 0.5 to 8 mole percent of manganese, and also contains at least one element selected from the rare earth metals where the mole percentage of said rare earth metals is greater than zero but not greater than ten.

4. A method for providing a multicomponent alloy for hydrogen storage and a hydride electrode, comprising the steps of:

providing a quantity of elements A, B, C, ..., where said elements are selected from the group consisting of Mg, Ti, V, Cr, Mn, Fe, Co, Ni, Al, Y, Zr, Nb, Pd, Mo, Ca, Si, C, Cu, Ta, and rare earth elements, said quantity of said elements including nickel and at least two other elements from said group;

apportioning said quantity of said elements in order to form a composition $A_aB_bC_c$... such that said composition $A_aB_bC_c$... contains 24 to 65 mole percent of nickel and further such that said composition $A_aB_bC_c$... had, when in the form of a multicomponent alloy, a heat of hydride formation that is in a range of between −3.5 and −9.0 Kcal/mole H, wherein said heat of hydride formation is defined by:

$$H_h = (aH_h(A) + bH_h(B) + cH_h(C) = \ldots) / (a+b+c\ldots) + K$$

where $H_h(A)$, $H_h(B)$, $H_h(C)$, ... are the heat of hydride formation of said elements A, B, C, ..., in units of Kcal/mole H, respectively, where said heat of hydride formation in said units for each of said elements is given as: $H_h(Mg) = -9.0$, $H_h(Ti) = -15.0$, $H_h(V) = -7.0$, $H_h(Cr) = -1.81$, $H_h(Mn) = -2.0$, $H_h(Fe) = 4.0$, $H_h(Co) = 4.0$, $H_h(Ni) = 2.0$, $H_h(Al) = -1.38$, $H_h(Y) = -27.0$, $H_h(Zr) = -19.5$, $H_h(Nb) = -9.0$, ~$H_h(Pd) = -4.0$, $H_h(Mo) = -1.0$, $H_h(Ca) = -21.0$, $H_h(Si) = -1.0$, $H_h(C) = -1.0$, $H_h(Cu) = 2.0$, $H_h(Ta) = -10.0$, and $H_h$(rare earth elements) = −25.0, where K is a constant having the values of 0.5, −0.2, and −1.5 Kcal/mole H for a+b+c+ ... equal to 2, 3, 6;

wherein said step of apportioning is carried out so that said composition comprises 1 to 20 mole percent of Cr, 0.5 to 10 percent of Al, and at least one element selected from the rare earth metals present in an amount greater than zero but not greater than 10 mole percent, and melting said composition $A_aB_bC_c$... in order to form said multicomponent alloy having a discharge capacity between a range of 250 to 315 mAh/g—has been inserted.

5. A multicomponent alloy for hydrogen storage and a hydride electrode for electrochemical application, prepared by a method comprising the steps of:

providing a quality of elements A, B, C, ..., where said elements are selected from the group consisting of Mg, Ti, V, Cr, Mn, Fe, Co, Ni, Al, Y, Zr, nb, Pd, Mo, Ca, Si, C, Cu, Ta, and rare earth elements, said quantity of said elements including nickel and at least two other elements from said group;

apportioning said quantity of said elements in order to form a composition $A_aB_bC_c$... such that said composition $A_aB_bC_c$... contains 24 to 65 mole percent of nickel and further such that said composition AaBbCc ... has; melting said composition to form said multicomponent alloy, said multicomponent alloy having a heat of hydride formation that is in a range of between −3.5 and −9.0 Kcal/mole H, wherein said heat of hydride formation is defined by:

$$H_h = (aH_h(A) + bH_h(B) + cH_h(C) = \ldots) / (a+b+c\ldots) + K$$

where $H_h(A)$, $H_h(B)$, $H_h(C)$, ... are the heat of hydride formation of said elements A, B, C, ..., in units of Kcal/mole H, respectively, where said heat of hydride formation in said units for each of said elements is given as: $H_h(Mg) = -9.0$, $H_h(Ti) = -15.0$, $H_h(V) = -7.0$, $H_h(Cr) = -1.81$, $H_h(Mn) = -2.0$, $H_h(Fe) = 4.0$, $H_h(Co) = 4.0$, $H_h(Ni) = 2.0$, $H_h(Al) = -1.38$, $H_h(Y) = -27.0$, $H_h(Zr) = -19.5$, $H_h(Nb) = -9.0$, $H_h(pb) = -4.0$, $H_h(Mo) = -1.0$, $H_h(Ca) = -21.0$, $H_h(Si) = -1.0$, $H_h(C) = -1.0$, $H_h(Cu) = 2.0$, $H_h(Ta) = -10.0$, and $H_h$(rare earth elements) = −25.0, where K is a constant having the value of 0.5, −0.2, and −1.5 Kcal/mole H for a+b+c+... equal to 2, 3, 6, respectively, and having the value zero Kcal/mole H for a+b+c+ ... not equal to 2, 3, 6.

wherein said method is performed so as to provide a multicomponent alloy having the formula:

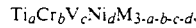

$$Ti_aCr_bV_cNi_dM_{3-a-b-c-d}$$

where M is at least one of the elements selected from the group consisting of Mg, Ti, V, Cr, Mn, Fe, Co, Ni, Al, Y, Zr, Nb, Pd, Mo, Ca, Si, C, Cu, Ta and rare earth elements having a discharge capacity between a range of 250 to 315 mAh/g—has been inserted.

6. A method of forming a multicomponent alloy for hydrogen storage and a hydride electrode for electrochemical application, comprising the steps of:

providing a quality of elements A, B, C, ..., where said elements are selected from the group consisting of Mg, Ti, V, Cr, Mn, Fe, Co, Ni, Al, Y, Zr, nb, Pd, Mo, Ca, Si, C, Cu, Ta, and rare earth elements, said quantity of said elements including nickel and at least two other elements from said group;

apportioning said quantity of said elements in order to from a composition $A_aB_bC_c$... such that said composition $A_aB_bC_c$... contains 24 to 65 mole percent of nickel and further such that said composition AaBbCc ... has; melting said composition to form said multicomponent alloy, said multicomponent alloy having a heat of hydride formation that is in a range of between −5.8 and −9.0 Kcal/mole H, wherein said heat of hydride formation is defined by:

$$H_h = (aH_h(A) + bH_h(B) + cH_h(C) = \ldots) / (a+b+c\ldots) + K$$

where $H_h(A)$, $H_h(B)$, $H_h(C)$, ... are the heat of hydride formation of said elements A, B, C, ..., in units of Kcal/mole H, respectively, where said heat of hydride formation in said units for each of said elements is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=4.0$, $H_h(Ni)=2.0$, $H_h(Al)=-1.38$, $H_h(Y)=-27.0$, $H_h(Zr)=-19.5$, $H_h(Nb)=-9.0$, $H_h(pb)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, and $H_h$(rare earth elements)$=-25.0$, where K is a constant having the value of 0.5, $-0.2$, and $-1.5$ Kcal/mole H for $a+b+c+\ldots$ equal to 2, 3, 6, respectively, and having the value zero Kcal/mole H for $a+b+c+\ldots$ not equal to 2, 3, 6 having a discharge capacity between a range of 250 to 315 mAh/g—has been inserted.

7. A multicomponent alloy for hydrogen storage and a hydride electrode for electrochemical application, prepared by the method comprising the steps of:

providing a quality of elements A, B, C, ..., where said elements are selected from the group consisting of Mg, Ti, V, Cr, Mn, Fe, Co, Ni, Al, Y, Zr, nb, Pd, Mo, Ca, Si, C, Cu, Ta, and rare earth elements, said quantity of said elements including nickel and at least two other elements from said group;

apportioning said quantity of said elements in order to from a composition $A_aB_bC_c\ldots$ such that said composition $A_aB_bC_c\ldots$ contains 24 to 65 mole percent of nickel and further such that said composition AaBbCc ... has;

melting said composition to form said multicomponent alloy, said multicomponent alloy having a heat of hydride formation that is in a range of between $-3.5$ and $-9.0$ Kcal/mole H, wherein said heat of hydride formation is defined by:

$H_h=(aH_h(A)+bH_h(B)+cH_h(C)=\ldots)/(a+b+c\ldots)+K$ where $H_h(A)$, $H_h(B)$, $H_h(C)$, ... are the heat of hydride formation of said elements A, B, C, ..., in units of Kcal/mole H, respectively, where said heat of hydride formation in said units for each of said elements is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=4.0$, $H_h(Ni)=2.0$, $H_h(Al)=-1.38$, $H_h(Y)=-27.0$, $H_h(Zr)=-19.5$, $H_h(Nb)=-9.0$, $H_h(pb)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, and $H_h$(rare earth elements)$=-25.0$, where K is a constant having the value of 0.5, $-0.2$, and $-1.5$ Kcal/mole H for $a+b+c+\ldots$ equal to 2, 3, 6, respectively, and having the value zero Kcal/mole H for $a+b+c+\ldots$ not equal to 2, 3, 6; and wherein said step of apportioning is carried out so that said composition comprises 1 to 20 percent Cr, 0.5 to 10 percent Al, and at least one element selected from the rare earth metals in an amount greater than zero but not greater than 10 percent having a discharge capacity between a range of 250 to 315 mAh/g—has been inserted.

8. A multicomponent alloy for hydrogen storage and a hydride for electrochemical application, prepared by the method comprising the steps of:

providing a quality of elements A, B, C, ..., where said elements are selected from the group consisting of Mg, Ti, V, Cr, Mn, Fe, Co, Ni, Al, Y, Zr, nb, Pd, Mo, Ca, Si, C, Cu, Ta, and rare earth elements, said quantity of said elements including nickel and at least two other elements from said group;

apportioning said quantity of said elements in order to from a composition $A_aB_bC_c\ldots$ such that said composition $A_aB_bC_c\ldots$ contains 24 to 65 mole percent of nickel and further such that said composition AaBbCc ... has; melting said composition to form said multicomponent alloy, said multicomponent alloy having a heat of hydride formation that is in a range of between $-3.5$ and $-9.0$ Kcal/mole H, wherein said heat of hydride formation is defined by:

$H_h=(aH_h(A)+bH_h(B)+cH_h(C)=\ldots)/(a+b+c\ldots)+K$ where $H_h(A)$, $H_h(B)$, $H_h(C)$, ... are the heat of hydride formation of said elements A, B, C, ..., in units of Kcal/mole H, respectively, where said heat of hydride formation in said units for each of said elements is given as: $H_h(Mg)=-9.0$, $H_h(Ti)=-15.0$, $H_h(V)=-7.0$, $H_h(Cr)=-1.81$, $H_h(Mn)=-2.0$, $H_h(Fe)=4.0$, $H_h(Co)=4.0$, $H_h(Ni)=2.0$, $H_h(Al)=-1.38$, $H_h(Y)=-27.0$, $H_h(Zr)=-19.5$, $H_h(Nb)=-9.0$, $H_h(pb)=-4.0$, $H_h(Mo)=-1.0$, $H_h(Ca)=-21.0$, $H_h(Si)=-1.0$, $H_h(C)=-1.0$, $H_h(Cu)=2.0$, $H_h(Ta)=-10.0$, and $H_h$(rare earth elements)$=-25.0$, where K is a constant having the value of 0.5, $-0.2$, and $-1.5$ Kcal/mole H for $a+b+c+\ldots$ equal to 2, 3, 6, respectively, and having the value zero Kcal/mole H for $a+b+c+\ldots$ not equal to 2, 3, 6; and wherein said step of apportioning is carried out further so that said composition $A_aB_bC_c\ldots$ of said elements A, B, C, ... contains 0.5 to 8 mole percent of manganese, and also contains at least one element selected from the rare earth metals where the mole percentage of said rare earth metals is greater than zero but not greater than ten having a discharge capacity between a range of 250 to 315 mAh/g—has been inserted.

* * * * *

UNITED STATES PATENT AND TRADEMARK OFFICE
CERTIFICATE OF CORRECTION

PATENT NO. : 5,006,328

DATED : April 9, 1991

INVENTOR(S) : Kuochih Hong

It is certified that error appears in the above-indentified patent and that said Letters Patent is hereby corrected as shown below:

Col. 10, line 41 should read as follows:
"ing of Mg, Ti, V, Cr, Mn, Fe, Co, Ni, Al, Y, Zr, Nb,"

Col. 10, line 55 should read as follows:
"$H_h = (a H_h (A) + bH_h (B) + cH_h (C) + ...)/(a+b+c+..$"

Col. 11, line 40 should read as follows:
"$H_h = (a H_h (A) + bH_h (B) + cH_h (C) + ...)/(a+b+c+..$"

Col. 12, line 3 should read as follows:
"ing of Mg, Ti, V, Cr, Mn, Fe, Co, Ni, Al, Y, Zr, Nb,"

Col. 12, line 17 should read as follows:
"$H_h = (a H_h (A) + bH_h (B) + cH_h (C) + ...)/(a+b+c+..$"

Col. 12, line 50 should read as follows:
"ing of Mg, Ti, V, Cr, Mn, Fe, Co, Ni, Al, Y, Zr, Nb,"

UNITED STATES PATENT AND TRADEMARK OFFICE
CERTIFICATE OF CORRECTION

PATENT NO. : 5,006,328

DATED : April 9, 1991

INVENTOR(S) : Kuochih Hong

It is certified that error appears in the above-indentified patent and that said Letters Patent is hereby corrected as shown below:

Col. 12, line 64 should read as follows:
"$H_h = (a H_h (A) + bH_h (B) + cH_h (C) + ...)/(a+b+c+..$"

Col. 13, line 19 should read as follows:
"ing of Mg, Ti, V, Cr, Mn, Fe, Co, Ni, Al, Y, Zr, Nb,"

Col. 13, line 33 should read as follows:
"$H_h = (a H_h (A) + bH_h (B) + cH_h (C) + ...)/(a+b+c+..$"

Col. 14, line 11 should read as follows:
"ing of Mg, Ti, V, Cr, Mn, Fe, Co, Ni, Al, Y, Zr, Nb,"

Col. 14, line 25 should read as follows:
"$H_h = (a H_h (A) + bH_h (B) + cH_h (C) + ...)/(a+b+c+..$"

Signed and Sealed this

Thirtieth Day of July, 1996

Attest:

BRUCE LEHMAN

*Attesting Officer*  *Commissioner of Patents and Trademarks*